(12) United States Patent
Mann et al.

(10) Patent No.: US 8,837,041 B2
(45) Date of Patent: Sep. 16, 2014

(54) MAGNIFYING IMAGING OPTICAL SYSTEM AND METROLOGY SYSTEM WITH AN IMAGING OPTICAL SYSTEM OF THIS TYPE

(75) Inventors: Hans-Juergen Mann, Oberkochen (DE); Heiko Feldmann, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 236 days.

(21) Appl. No.: 13/302,147

(22) Filed: Nov. 22, 2011

(65) Prior Publication Data

US 2012/0127566 A1    May 24, 2012

Related U.S. Application Data

(60) Provisional application No. 61/416,535, filed on Nov. 23, 2010.

(51) Int. Cl.
*G02B 17/00* (2006.01)
*G02B 17/06* (2006.01)

(52) U.S. Cl.
CPC ................................ *G02B 17/0663* (2013.01)
USPC ............................ 359/366; 359/859; 359/861

(58) Field of Classification Search
USPC ......... 359/362–366, 838, 850–869, 368–398, 359/399–401, 419–423, 432–435; 378/43
See application file for complete search history.

(56) References Cited

U.S. PATENT DOCUMENTS

| 1,747,928 | A | 2/1930 | Chesney |
| 5,071,240 | A | 12/1991 | Ichihara et al. |
| 5,253,117 | A | 10/1993 | Kashima |
| 6,894,834 | B2 | 5/2005 | Mann et al. |
| 7,623,620 | B2 * | 11/2009 | Mann et al. ............ 378/43 |

FOREIGN PATENT DOCUMENTS

| DE | 102 20 815 | 11/2003 | ............ G21K 7/00 |
| WO | 2006/069725 | 7/2006 | ............ G02B 17/06 |

* cited by examiner

*Primary Examiner* — Stephone B Allen
*Assistant Examiner* — James McGee
(74) *Attorney, Agent, or Firm* — Fish & Richardson P.C.

(57) ABSTRACT

A magnifying imaging optical system is disclosed that has precisely three mirrors, which image an object field in an object plane into an image field in an image plane. A ratio between a transverse dimension of the image field and a transverse dimension measured in the same direction of a useful face of the last mirror before the image field is greater than 3. In a further aspect, the magnifying imaging optical system is disclosed that has at least three mirrors, which image an object field in an object plane in an image field in an image plane. A first mirror in the beam path after the object field is concave, a second mirror is also concave and a third mirror is convex. An angle of incidence of imaging beams on the last mirror before the image field is less than 15°.

18 Claims, 4 Drawing Sheets

MAGNIFYING IMAGING OPTICAL SYSTEM AND METROLOGY SYSTEM WITH AN IMAGING OPTICAL SYSTEM OF THIS TYPE

CROSS-REFERENCE TO RELATED APPLICATION

Under 35 U.S.C. §119, this application claims the benefit of prior U.S. provisional application No. 61/416,535, filed Nov. 23, 2010, which is incorporated in its entirety herein by reference.

TECHNICAL FIELD

The invention relates to a magnifying imaging optical system and a metrology system with an imaging optical system of this type.

BACKGROUND

A magnifying imaging optical system is known from DE 102 20 815 A1 for the simulation and analysis of effects of properties of masks for microlithography. Further imaging optical systems are known from U.S. Pat. No. 6,894,834 B2, WO 2006/0069725 A1 and U.S. Pat. No. 5,071,240.

SUMMARY

An object of certain embodiments disclosed herein is to develop an imaging optical system such as that described in the background in such a way that requirements of a mirror quality of the imaging optical system are reduced.

In general, in one aspect, a magnifying imaging optical system is disclosed having precisely three mirrors, which image an object field in an object plane into an image field in an image plane.

The imaging optical system may include one or more of the following features.

In certain embodiments, a ratio between a transverse dimension of the image field and a transverse dimension measured in the same direction of a useful face of the last mirror before the image field is greater than 3.

In certain embodiments, the first mirror in the beam path after the object field is concave, the second mirror in the beam path after the object field is concave and the third mirror in the beam path after the object field is convex.

In certain embodiments, a ratio between a transverse dimension of a useful face of a last mirror in the beam path between the object field and the image field and a diameter of a subaperture on the last mirror is less than 20.

In certain embodiments, the imaging optical system has at least one intermediate image between the object field and the image field.

In certain embodiments, an angle of incidence of imaging beams on the last mirror before the image field is less than 15°.

In certain embodiments, the imaging optical system has an imaging scale of at least 500.

In certain embodiments, a size of the object field of the imaging optical system is at least 20 µm×20 µm.

In certain embodiments, the imaging optical system has an object-side numerical aperture of at least 0.1.

The embodiments may have one or more of the following advantages.

For example, it was recognised by the inventors that a design of the magnifying imaging optical system with precisely three mirrors and a last mirror in relation to the image field dimension with a small required useful face reduces the requirements of the quality in the production of this last mirror. It is not necessary to precisely polish this last mirror over a large area. The transverse dimension ratio between the image field dimension and the useful face dimension of the last mirror may be greater than 5, may be greater than 10, may be greater than 20 and may, for example, be 20.16 or 28.68.

A shape sequence concave/concave/convex according to the further aspect has proven to be particularly suitable in the imaging optical system. A shape sequence of this type favours a design of an imaging beam path, in which individual field point contributions on the mirrors of the imaging optical system mix well. This reduces the requirements of the production quality and the operating requirements of the mirrors of the imaging optical system. The convex mirror favours a divergent course of the main beams from this mirror, in other words a fanning out of the imaging beam path. This makes it possible to enlarge the imaging beam path where necessary, in particular close to the image field, with respect to the diameter, it being possible for the imaging beam path to advantageously be configured with a small diameter in the region of the mirrors guiding the imaging beam path. Each of the mirrors of the magnifying imaging optical system according to the further aspect is impinged upon precisely once by imaging beams. This increases a flexibility of the structure of the magnifying imaging optical system, in particular an adjustment flexibility as each reflective surface in the imaging beam path can be arranged, and in particular can be adjusted, independently of the reflective surfaces of reflective surfaces upstream or downstream in the beam path.

A transverse dimension ratio between a useful face dimension of the last mirror and a subaperture diameter on this last mirror reduces the cleanliness requirements in the production and operation of the last mirror of the imaging optical system as the individual field point contributions on the last mirror mix well because of this dimension ratio. The subaperture is that part of the total imaging beam path, which is associated precisely with one field point in each case. In a pupil plane, the subaperture is precisely as large as the pupil itself. In a field plane, the subaperture has the diameter 0, in other words is punctiform. The transverse dimension ratio of the useful face of the last mirror and the subaperture diameter may be less than 10, may be less than 5, may be 4.43, may be less than 2 and may be 1.98. The above-mentioned transverse dimension ratios useful face dimension/subaperture diameter can be fulfilled in all the mirrors of the magnifying imaging optical system.

An intermediate image in the vicinity of the intermediate image plane, leads to a compact beam path and thus facilitates a compact configuration of the imaging optical system. The imaging optical system may have precisely one intermediate image between the object field and the image field.

A maximum angle of incidence allows a configuration of the imaging optical system with a highly reflective multilayer coating to optimise a useful light throughput of the imaging optical system.

An imaging scale leads to good suitability of the imaging optical system in the framework of a metrology and inspection system. The imaging scale may be 750.

An object field size leads to good suitability of the magnifying imaging optical system in a metrology system.

An object-side numerical aperture is well adapted to the imaging conditions of projection lens systems of projection exposure systems for EUV microlithography for producing macrostructured or nanostructured components. The object-side numerical aperture may be 0.118. The imaging optical system can be designed in such a way that a change over can be made between various object-side numerical apertures with the aid of an aperture stop.

A decentrable aperture stop can also be used to adjust, for example, a main beam angle of the imaging beams emanating from the object field. The decentrable aperture stop can be decentred in the stop plane and simultaneously in a meridional plane of the imaging optical system. Alternatively or in addition, the decentrable aperture stop can be decentred in the stop plane and perpendicular to the meridional plane. The decentrable aperture stop may be elliptical and may be configured to be rotatable about an axis guided in parallel to the optical axis of the imaging optical system through the elliptical centre point of the stop.

In general, in another aspect, a magnifying imaging optical system is disclosed that includes at least three mirrors, which image an object field in an object plane into an image field in an image plane. A first mirror in the beam path after the object field is concave, a second mirror in the beam path after the object field is concave and a third mirror in the beam path after the object field is convex. An angle of incidence of imaging beams on the last mirror before the image field is less than 15°. A ratio between a transverse dimension of the image field and a transverse dimension measured in the same direction of a useful face of the last mirror before the image field is greater than 3.

Embodiments of the magnifying imaging optical system may further include features and advantages described above. For example, in certain embodiments, a ratio between a transverse dimension of a useful face of a last mirror in the beam path between the object field and the image field and a diameter of a subaperture on the last mirror is less than 20.

In each aspect, the described features of the imaging optical systems may be present in combination with one another.

In any of the embodiments described above, the imaging optical system can also, of course, be used reversed as a reducing imaging optical system, the object field and image field then exchanging their function and the ratio between the object size and image size being used as the imaging scale. If object-side components of the imaging optical system are referred to below, those components on the high aperture side of the imaging optical system are meant. If image-side components of the imaging optical system are referred to, the components on the low aperture side are meant. If the imaging optical system is used as a reducing imaging optical system, the light path of imaging light passes from the low aperture side to the high aperture side of the imaging optical system. The two mirrors closest to the field in the imaging beam path on the high aperture side of the imaging optical system may be concave. This leads to the possibility of a well-corrected design of the imaging optical system.

Finally, any of the embodiments described above for the imaging optical system can be used in a metrology system for investigating objects.

In this regard, in another aspect, a metrology system for investigating objects is also disclosed. The metrology system includes: an imaging optical system as disclosed above; a light source for illuminating the object field; and a spatially resolving detection device detecting the image field.

Other aspects, features, and advantages follow.

DESCRIPTION OF DRAWINGS

Embodiments of the invention will be described below in more detail in the drawings.

DETAILED DESCRIPTION

Figure 1:
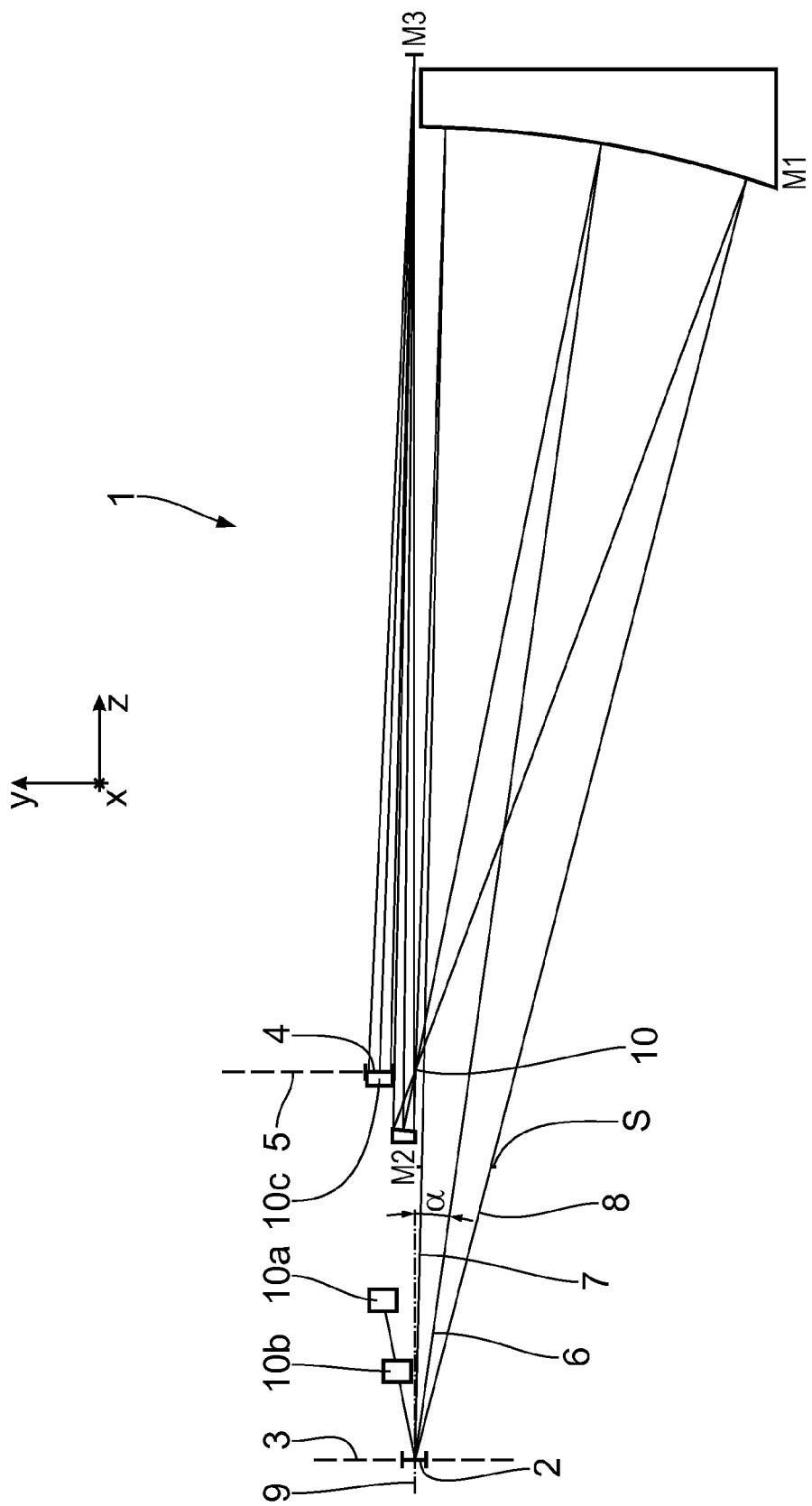
FIG. 1 shows a meridional section through a first embodiment of a magnifying imaging optical system for use in a metrology system for the simulation and analysis of effects of properties of lithography masks on an optical imaging within a projection optical system of a projection exposure system for microlithography and for the detection of mask defects over a large area.

A magnifying imaging optical system 1, which is shown in FIG. 1, is used in a metrology system for analysing a lithography mask for structuring defects. The structuring defects can be investigated with the aid of an analysis of a so-called aerial image (AIMS). The metrology system is used for the simulation and analysis of the effects of properties of lithography masks, which are in turn used in projection exposure for producing semiconductor components, on the optical imaging of projection optical systems within the projection exposure system. AIMS systems are known, for example, from DE 102 20 815 A1.

The imaging optical system 1 images an object field 2 in an object plane 3 with a magnification factor of 750 into an image field 4 in an image plane 5. The lithography mask to be measured, which is also called a reticle, can be arranged in the object field 2. A CCD chip, which is sensitive to the imaging wavelength, of a CCD camera may be arranged in the image field 4 for the analysis of the magnified image produced.

To facilitate the view of positional relationships, a Cartesian xyz coordinates system will be used below. The x-axis runs perpendicular to the plane of the drawing in FIG. 1 and into it. The y-axis runs upwardly in FIG. 1. The z-axis runs to the right in FIG. 1.

To illustrate an imaging beam path of the imaging optical system 1, FIG. 1 shows the course of main beams 6 and coma beams 7, 8, which emanate from three object field points, located one above the other in the x-direction. The main beams 6, on the one hand, and the coma beams 7, 8, on the other hand, will also be called imaging beams below.

The object field 2, on the one hand, and the image field 4, on the other hand, lie in xy-planes that are spaced apart from one another. The object field 2, in the x-direction and in the y-direction, has an extent (transverse dimension) in each case of 20 μm, in other words has a field size of 20×20 μm².

The main beams 6 proceed in the imaging beam path between the object field 2 and the image field 4 out from the object field 2 at a main beam angle α of 8° to a normal line running in the z-direction to a central object field point of the object plane 3. Other main beam angles α, in particular a smaller main beam angle α of 6°, are possible depending on the selected aperture.

An object field-side numerical aperture of the imaging optical system 1 is NAO=0.118. With the aid of a decentrable aperture stop S, the object field-side numerical aperture can be reduced to NAO=0.0825, it being possible to simultaneously realise a main beam angle α of 6°. The aperture stop S can be decentrable in the y-direction and/or in the x-direction. The aperture stop S may be configured with an elliptical stop opening. In this case, the aperture stop S may be rotatable about an axis guided parallel to the optical axis of the imaging optical system 1 through the aperture stop elliptical centre point, in particular with the aid of a drive motor.

In the image plane 5, the imaging beams 6 to 8 meet virtually perpendicular to the image plane 5 in an image field point of the image field 4, in each case. The main beams 6, which belong to each of the image field points, run divergently with respect to one another. This leads to the image field 4 being significantly larger than the last mirror M3.

In the imaging beam path between the object field 2 and the image field 4, the imaging optical system, 1 has precisely three mirrors, which are designated M1, M2 and M3 below in the order of their arrangement in the imaging beam path. The three mirrors M1 to M3 are three optical components which are separate from one another.

The decentrable and exchangeable aperture stop S is arranged in the installation space between the object plane 3 and the mirror M2 in the beam path between the object field 2 and the mirror M1.

The first mirror M1 in the beam path between the object field 2 and the image field 4 is aspherical and the further mirror M2 and M3 are spherical.

FIG. 1 shows the sectional curves of parent faces, which are used for the mathematical modelling of reflection faces of the mirrors M1 to M3. Actually physically present in the sectional plane shown are those regions of the reflection faces of the mirrors M1 to M3, which are actually impinged upon by imaging radiation by the coma beams 7, 8 and between the coma beams 7, 8.

An intermediate image 10 is present in the imaging beam path between the mirrors M1 and M2.

The imaging optical system, 1 is designed for an operating wavelength of 13.5 nm.

Optical data of the optical imaging system 1 according to FIG. 1 will be reproduced below with the aid of two tables. The first table in the column "Radius" in each case shows the radius of curvature of the mirrors M1 to M3. The third column (thickness) describes the spacing, proceeding from the object plane 3, in each case with respect to the following surface in the z-direction.

The second table describes the precise aspherical surface shape of the reflection faces of the mirror M1, the constants K and A to E having to be inserted into the following equation for the arrow height:

$$z(h) = \frac{ch^2}{1 + SQRT\{1 - (1+K)c^2h^2\}} + Ah^4 + Bh^6 + Ch^8 + Dh^{10} + Eh^{12} (+FH^{14} + Gh^{16})$$

h represents the spacing here from the optical axis, in other words from the normal 9, of the imaging optical system 1. $h^2 = x^2 + y^2$ therefore applies. The reciprocal of "radius" is inserted in the equation for c.

| Face | Radius | Thickness | Operating mode |
|---|---|---|---|
| Object | infinite | 257.878 | |
| Stop | infinite | 891.940 | |
| M1 | −952.018 | −861.937 | REFL |
| M2 | 94.260 | 912.119 | REFL |
| M3 | 30.892 | −862.121 | REFL |
| Image | infinite | 0.000 | |

| Face | K | A | B |
|---|---|---|---|
| M1 | 0.000000E+00 | 5.968375E−12 | 6.442743E−18 |
| Face | C | D | E |
| M1 | 6.234558E−24 | 8.904749E−30 | 0.000000E+00 |

The following table reproduces the angles of incidence of the main beam 6 of the central object field point on the individual mirrors M1 to M3:

| | Angles of incidence of the main beam of the central field point |
|---|---|
| M1 | 1.5° |
| M2 | 5.5° |
| M3 | 1° |

The maximum angle of incidence is so small that it is sufficient to apply the mirrors M1 to M3 for the operating wavelength at 13.5 nm with a multilayer coating with a constant individual layer thickness over the used reflection face of the mirrors M1 to M3. With comparatively simple production, high degrees of reflection of the mirrors M1 to M3 and a correspondingly high throughput of the imaging optical system 1 for the operating wavelength of 13.5 nm are thus produced.

An installation length T, in other words, a spacing between the object plane 3 and the mirror M3 furthest away in the z-direction, is 1200 mm. A ratio of the installation length T and the imaging scale β is 1200 mm/750=1.6 mm.

The image field 4 in the x-direction and in the y-direction has an extent of 15 mm in each case. A transverse dimension of the image field, measured in the meridional plane according to FIG. 1, in other words along the y-direction, is therefore 15 mm. In the same direction, a transverse dimension of a useful face of the last mirror M3 is 0.523 mm. A ratio between a transverse dimension of the image field 4 and a transverse dimension measured in the same direction of the useful face of the last mirror M3 is therefore 28.68.

The transverse dimension is therefore the y-direction, in each case, in the embodiments described.

A subaperture of the imaging beam path, on the last mirror M3, has a diameter of 0.264 mm. The subaperture is that part of the entire imaging beam path between the object field 2 and the image field 4, which is associated precisely with one field point. In a pupil plane of the imaging beam path, the subaperture is the same size as the pupil itself. In a field plane of the imaging beam path, the subaperture has the diameter 0, in other words is punctiform. A ratio between the transverse dimension of the useful face of the last mirror M3 in the meridional plane (0.523 mm) and the diameter of the subaperture on this last mirror M3 (0.264 mm) is 1.98.

The main beams 6 of various field points between the last mirror M3 and the image field 4 run divergently.

The imaging optical system 1 is therefore part of a metrology system. This metrology system also includes a light source 10*a*, which provides illumination light at the operating wavelength of 13.5 mm, and an illumination optical system 10*b* for illuminating the object field 2 and the CCD-chip 10*c* already mentioned in connection with the image field 4, which is part of a detection device of the metrology system.

The light sources also conventional for lithography systems, in other words, for example, laser plasma sources (LPP) or else discharge sources (DPP) are possible light sources. In comparison to the light sources for lithography systems, the light sources for the metrology system require a significantly smaller source power because of the small object field size.

A further configuration of an imaging optical system 11, which can be used instead of the imaging optical system 1 according to FIG. 1, will be described below with the aid of FIG. 2. Components and functions, which correspond to those which have already been described above with reference to FIG. 1, have the same reference numerals and will not be discussed again in detail. The differences from the previous embodiment will be discussed below.

A difference in the imaging beam path between the imaging optical systems 1 and 11 is in the beam guidance between the mirror M3 and the image field 4. The angle of incidence of the main beam of the central field point on the mirror M3 of the imaging optical system 11 is about 4°, in other words significantly larger than in the imaging optical system 1. The result is a clear separation of the imaging beam path, on the one hand, between the mirrors M2 and M3 and, on the other hand, between the mirror M3 and the image field 4. This allows the spacing between the last mirror M3 and the image field 4 with the CCD-chip that can be arranged there to be significantly reduced compared to the arrangement according to FIG. 1. A spacing between the mirror M3 and the image field 4 is only slightly more than 60% of the spacing between the mirrors M2 and M3.

The optical data of the imaging optical system 11 according to FIG. 2 will be reproduced below with the aid of two tables, which correspond to the tables of the imaging optical system 1 according to FIG. 1 with regard to the structure.

| Face | Radius | Thickness | Operating mode |
|---|---|---|---|
| object | infinite | 250.843 | |
| stop | infinite | 919.336 | |
| M1 | −966.609 | −845.204 | REFL |
| M2 | 42.650 | 895.217 | REFL |
| M3 | 45.098 | −545.217 | REFL |
| image | infinite | 0.000 | |

| Face | K | A | B |
|---|---|---|---|
| M1 | 0.000000E+00 | 4.912195E−12 | 5.176188E−18 |
| Face | C | D | E |
| M1 | 4.855906E−24 | 6.801811E−30 | 0.000000E+00 |

Figure 2:
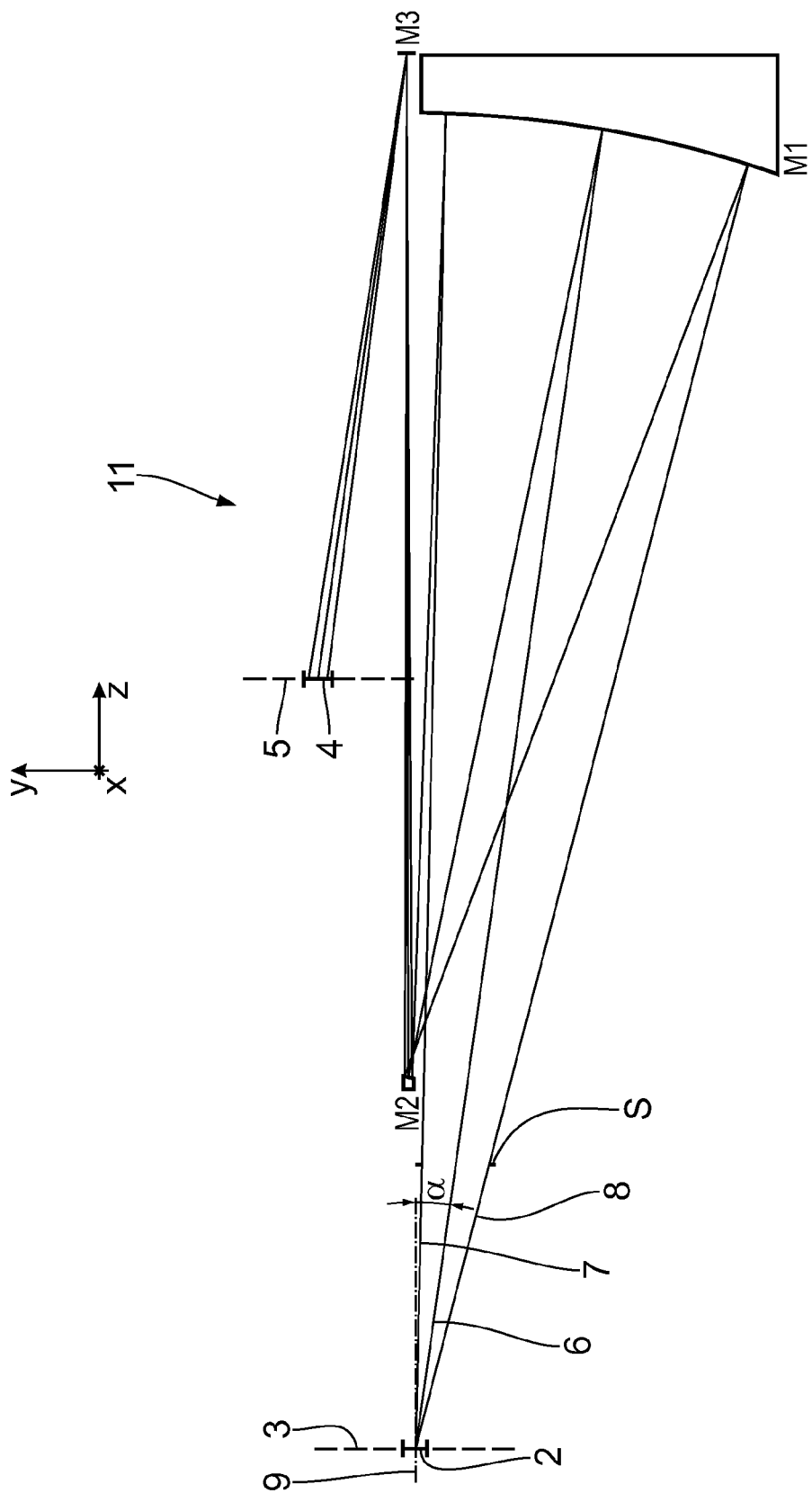
FIGS. 2 and 3 in each case show, in a view similar to FIG. 1, a further embodiment of the imaging optical system.

The useful face of the mirror M3, measured in the meridional plane according to FIG. 2, has a transverse dimension of 0.744 mm. The ratio between the transverse dimension of the image field 4 (15 mm) and this useful face transverse dimension in the imaging optical system 11 is therefore 20.16.

A subaperture diameter on the last mirror M3 is 0.168 mm. A ratio of the useful face transverse dimension of the mirror M3 in the meridional plane according to FIG. 2 and the subaperture diameter is therefore 4.43.

A further embodiment of an imaging optical system 12, which can be used instead of the imaging optical system 1 according to FIG. 1, will be described below with the aid of FIG. 3. Components and functions, which correspond to those which have already been described above with reference to FIG. 1, have the same reference numerals and will not be discussed again in detail. The differences from the previous embodiment will be discussed below.

The imaging optical system 12 has precisely four mirrors M1 to M4. The four mirrors M1 to M4 are four optical components which are separate from one another. With regard to the basic arrangement, the mirror M4 is arranged approximately where the image field 4 is arranged in the imaging optical system 1 according to FIG. 1. The angle of incidence of the main beam of the central field point for the mirrors M1 to M3 correspond to those which were mentioned above in connection with the imaging optical system 1 according to FIG. 1. The angle of incidence of the main beam of the central field point on the mirror M4 is 1.5°.

The mirror M4 is spherically and convexly shaped.

Figure 3:
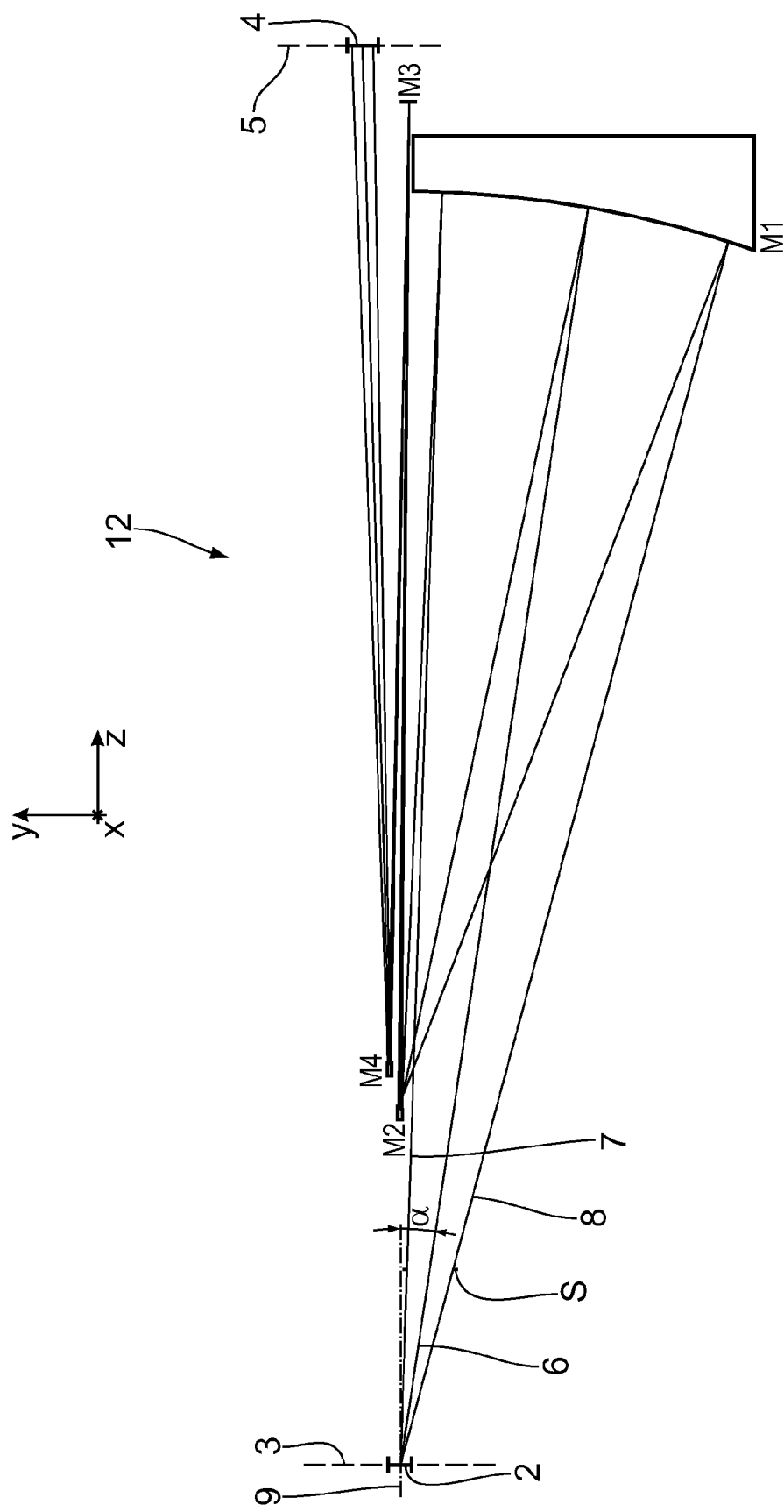

A useful face of the last mirror M4 of the imaging optical system 12, measured in the meridional plane according to FIG. 3, has a transverse dimension of 4.238 mm. A ratio between the transverse dimension of the image field (15 mm) and the useful face transverse dimension of the mirror M4 (4.238 mm) is therefore 3.54 in the imaging optical system 12. A subaperture on the last mirror M4 has a diameter of 0.218 mm. A ratio between the useful face transverse dimension of the mirror M4 (4.238 mm) and the subaperture diameter (0.218 mm) is therefore 19.44 in the imaging optical system.

The imaging optical system 12, between the object plane 3 and the image plane 5, has an installation length of 1000 mm.

A ratio of the installation length T and the imaging scale β is 1000 mm/750=1.333.

The optical data of the imaging optical system 12 according to FIG. 3 will be reproduced below with the aid of two tables, which correspond to the tables of the imaging optical system 1 according to FIG. 1 with regard to the structure.

| Face | Radius | Thickness | Operating mode |
|---|---|---|---|
| object | infinite | 137.852 | |
| stop | infinite | 761.737 | |
| M1 | −746.256 | −646.241 | REFL |
| M2 | 17.169 | 696.574 | REFL |
| M3 | 850.000 | −666.574 | REFL |
| M4 | −731.268 | 716.651 | REFL |
| image | infinite | 0.000 | |

| Face | K | A | B |
|---|---|---|---|
| M1 | 0.000000E+00 | 9.553424E−12 | 1.675218E−17 |
| Face | D | E | F |
| M1 | 3.069954E−23 | 1.504440E−29 | 2.323575E−34 |

The installation length T always relates to an unfolded configuration of the imaging optical system, in other words to a configuration without interposed plane mirrors acting in a purely deflective manner. The installation length T is either defined by the spacing between the object field and the image field, by the spacing between the object field and the optical component most remote therefrom or by the spacing between the image field and the optical component most remote therefrom.

The following table again summarises some characteristic variables of the imaging optical systems 1, 11 and 12:

| | E1 | E2 | E3 |
|---|---|---|---|
| Diameter of the last mirrors in the meridional plane [mm] | 0.523 | 0.744 | 4.238 |
| Subaperture (SA) diameter of the last mirrors [mm] | 0.264 | 0.168 | 0.218 |
| Ratio: diameter of the last mirrors/SA diameter [mm] | 1.98 | 4.43 | 19.44 |
| Diameter of the image field (meridional plane) | 15.00 | 15.00 | 15.00 |
| Ratio of the diameter image field/diameter of the last mirrors | 28.68 | 20.16 | 3.54 |

Figure 4:
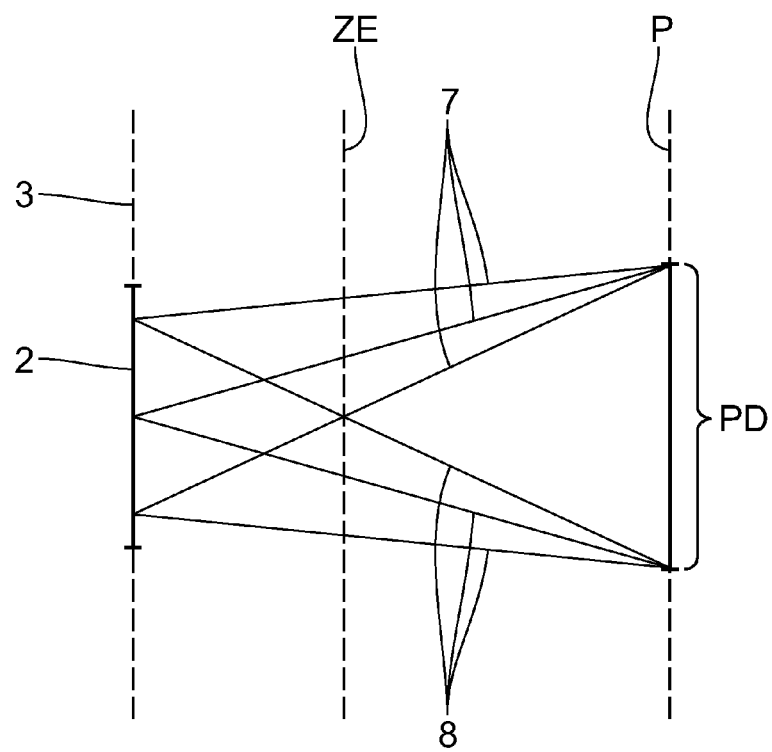
FIG. 4 schematically shows the course of subapertures between a field plane and a pupil plane.

FIG. 4 illustrates the subaperture diameter between the object plane 3 and a pupil plane P. FIG. 4 exclusively shows the coma beams 7, 8, which emanate from three object field points and limit the subapertures. In the object field 3, the subapertures have a diameter of 0. In the pupil plane P, the subapertures spanned by the coma beams 7, 8 have a diameter corresponding to the pupil diameter PD. In an intermediate plane ZE, shown by way of example between the object plane 3 and the pupil plane P, the subapertures have a diameter, which corresponds approximately to half the total diameter of the imaging beam path. If a mirror were arranged in the intermediate plane ZE, the ratio between a transverse dimension of the mirror useful face and the diameter of the subaperture would be 2 there.

Other embodiments are within the scope of the following claims.

What is claimed is:

1. A magnifying imaging optical system having precisely three mirrors, which image an object field in an object plane into an image field in an image plane, wherein a ratio between a transverse dimension of the image field and a transverse dimension measured in the same direction of a useful face of a last mirror before the image field is greater than 3.

2. An imaging optical system according to claim 1, wherein a size of the object field is at least 20 µm×20 µm.

3. An imaging optical system according to claim 1, having an object-side numerical aperture of at least 0.1.

4. An imaging optical system according to claim 1, having at least one intermediate image between the object field and the image field.

5. An imaging optical system according to claim 1, wherein an angle of incidence of imaging beams on the last mirror before the image field is less than 15°.

6. An imaging optical system according to claim 1, wherein a ratio between a transverse dimension of a useful face of a last mirror in a beam path between the object field and the image field and a diameter of a subaperture on the last mirror is less than 20.

7. An imaging optical system according to claim 1, having an imaging scale of at least 500.

8. A metrology system for investigating objects, comprising
an imaging optical system according to claim 1,
a light source for illuminating the object field, and
a spatially resolving detection device detecting the image field.

9. A magnifying imaging optical system having precisely three mirrors, which image an object field in an object plane into an image field in an image plane, wherein a first mirror in a beam path after the object field is concave, a second mirror in the beam path after the object field is concave and a third mirror in the beam path after the object field is convex, and
light in the beam path is configured to be reflected only once at each of the precisely three mirrors.

10. An imaging optical system according to claim 9, wherein a size of the object field is at least 20 µm×20 µm.

11. An imaging optical system according to claim 9, having at least one intermediate image between the object field and the image field.

12. An imaging optical system according to claim 9, wherein an angle of incidence of imaging beams on a last mirror before the image field is less than 15°.

13. An imaging optical system according to claim 9, wherein a ratio between a transverse dimension of a useful face of a last mirror in the beam path between the object field and the image field and a diameter of a subaperture on the last mirror is less than 20.

14. An imaging optical system according to claim 9, having an imaging scale of at least 500.

15. A metrology system for investigating objects, comprising
an imaging optical system according to claim 9,
a light source for illuminating the object field, and
a spatially resolving detection device detecting the image field.

16. A magnifying imaging optical system, comprising
at least three mirrors, which image an object field in an object plane into an image field in an image plane,
wherein a first mirror in a beam path after the object field is concave, a second mirror in the beam path after the object field is concave and a third mirror in the beam path after the object field is convex,
wherein an angle of incidence of imaging beams on a last mirror before the image field is less than 15°,
wherein a ratio between a transverse dimension of the image field and a transverse dimension measured in the same direction of a useful face of the last mirror before the image field is greater than 3.

17. An imaging optical system according to claim 16, wherein a ratio between a transverse dimension of a useful face of a last mirror in the beam path between the object field and the image field and a diameter of a subaperture on the last mirror is less than 20.

18. A metrology system for investigating objects, comprising
an imaging optical system according to claim 16,
a light source for illuminating the object field, and
a spatially resolving detection device detecting the image field.

* * * * *